Feb. 25, 1936.  G. H. LENKE  2,031,896
MEANS FOR SUPPORTING SKYLIGHT GLASSES AND THE LIKE
Filed May 15, 1935  4 Sheets-Sheet 3
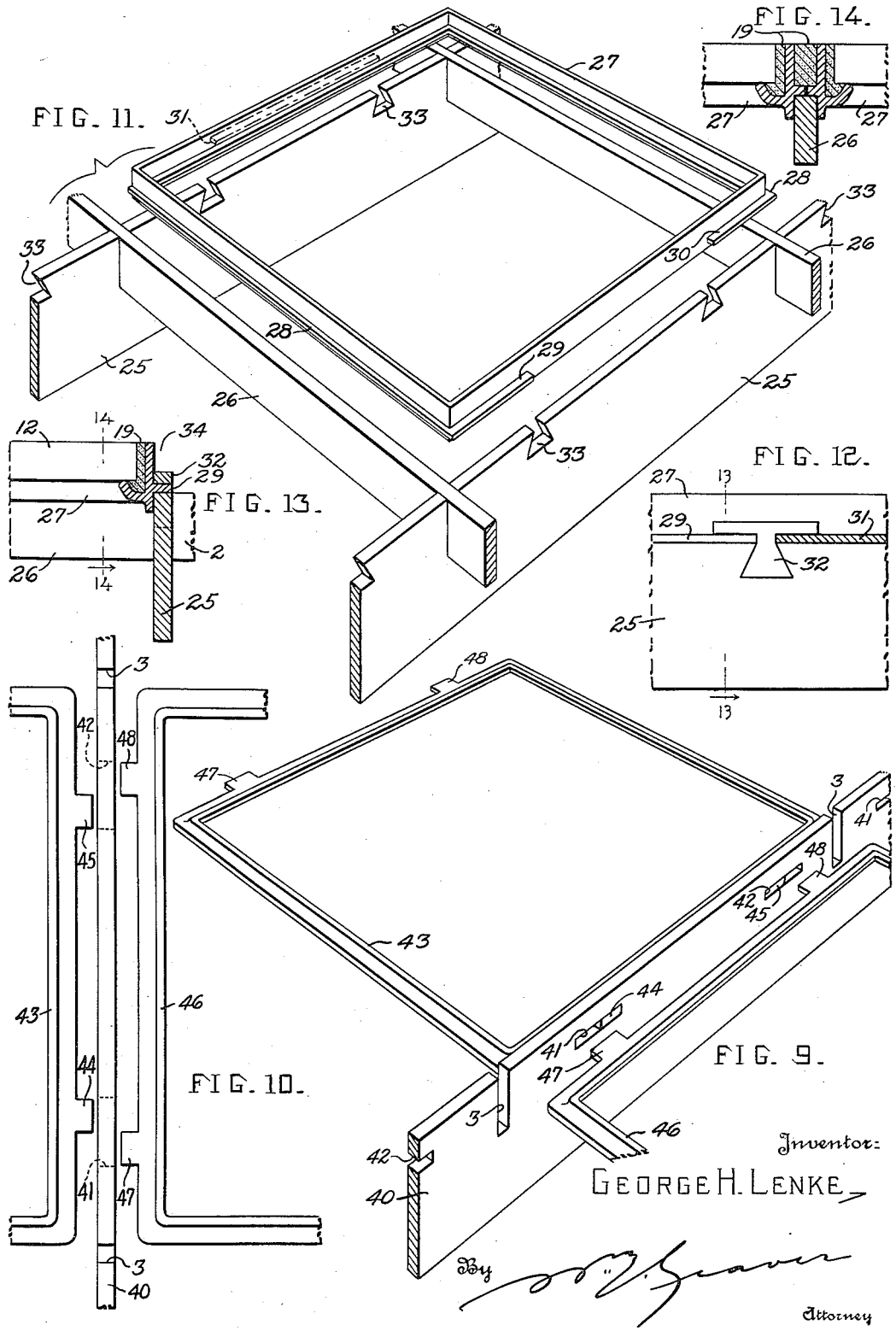

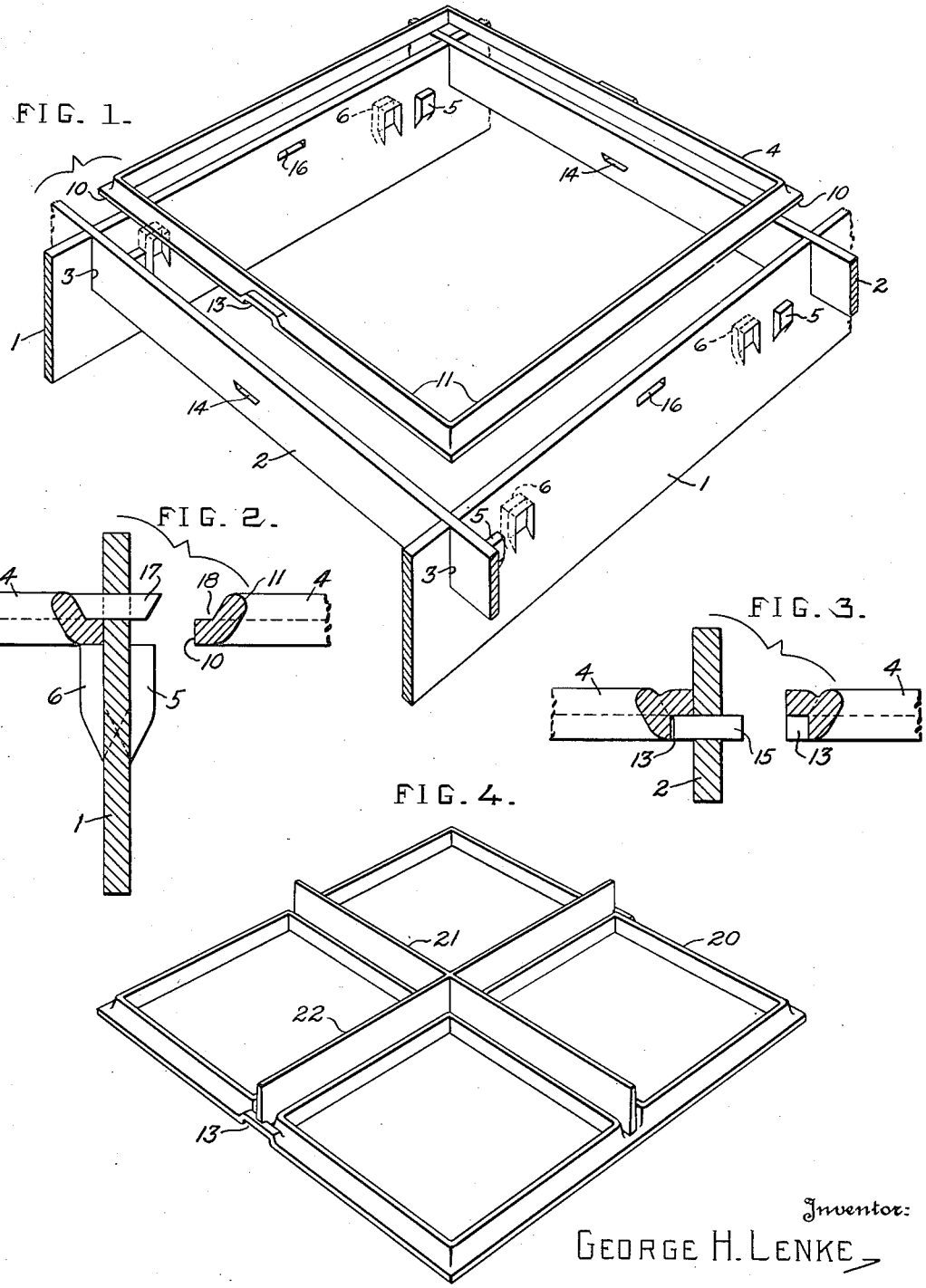

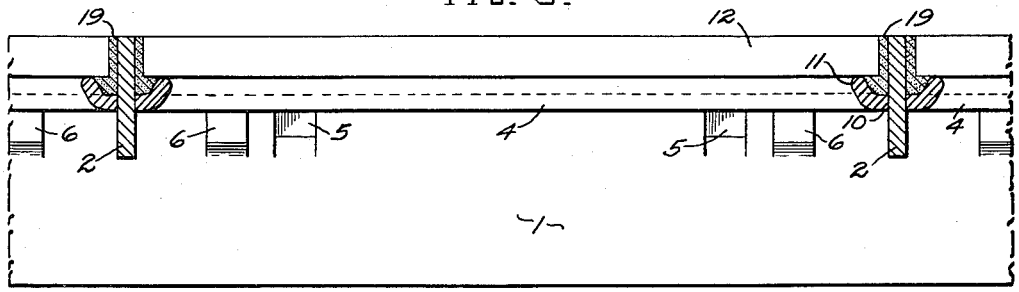
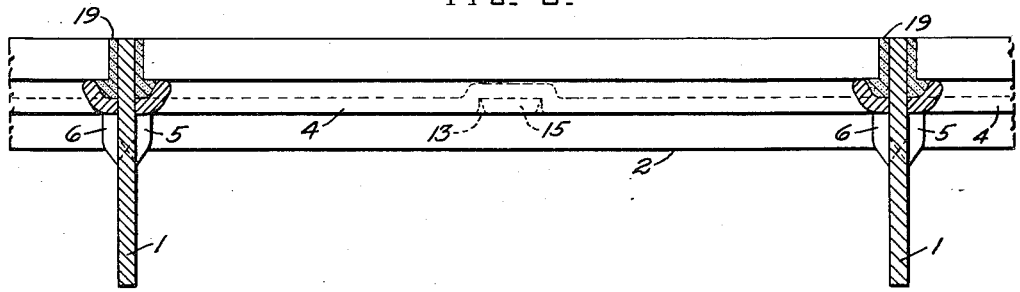
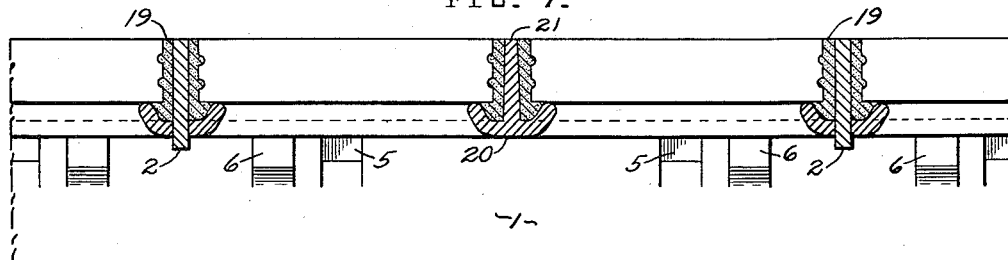
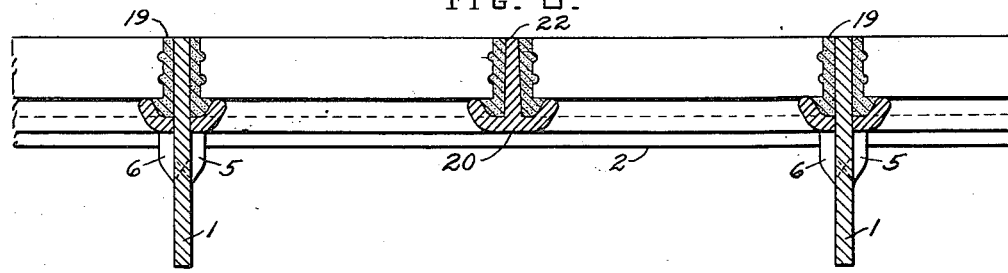

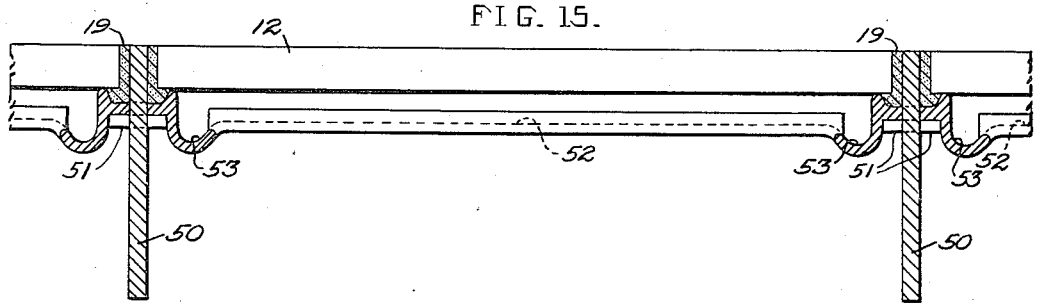
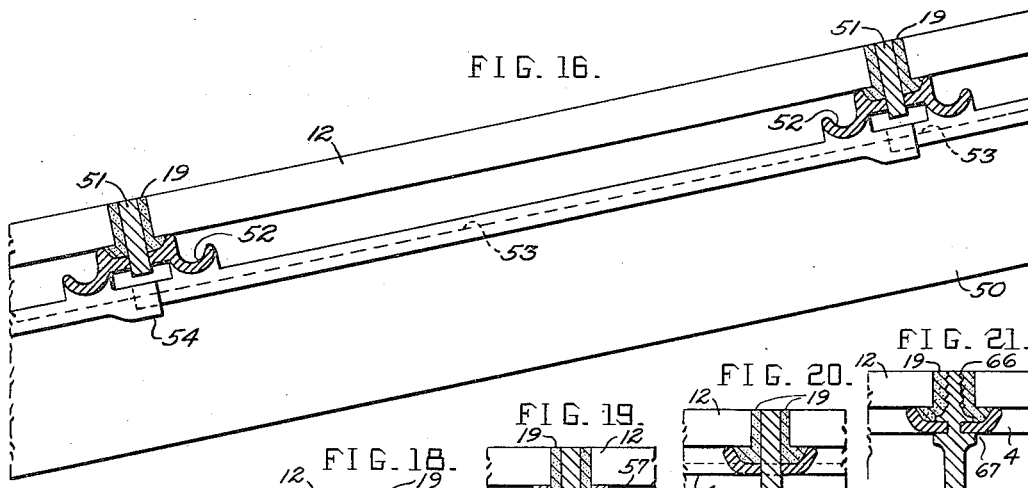
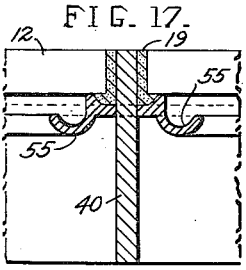
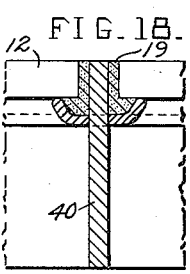
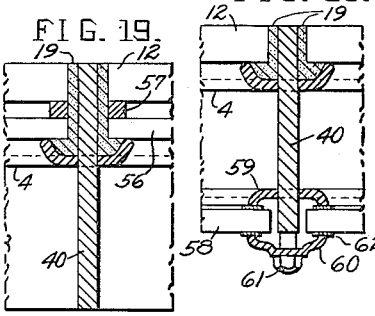
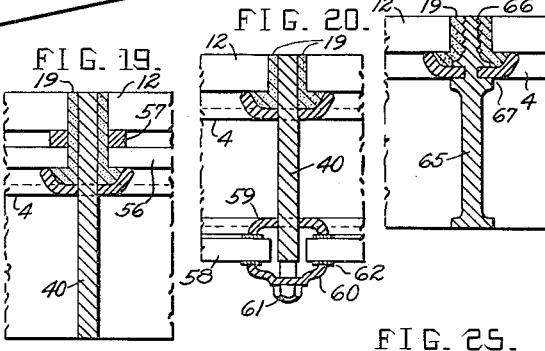
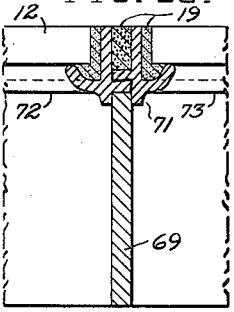
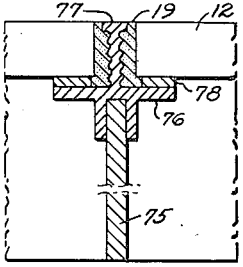
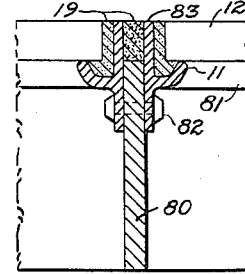

Patented Feb. 25, 1936

2,031,896

UNITED STATES PATENT OFFICE 2,031,896

MEANS FOR SUPPORTING SKYLIGHT GLASSES AND THE LIKE

George H. Lenke, Elmhurst, Ill.

Application May 15, 1935, Serial No. 21,621

13 Claims. (Cl. 108—16)

This invention relates to skylights, vault lights, windows, manhole covers and the like, having for its object to provide a construction simple in parts, capable of ready assemblage, and less costly to manufacture than those heretofore proposed.

With these and other objects in view the invention resides in the novel details of construction and combinations of parts as will be disclosed more fully hereinafter and particularly pointed out in the claims.

Referring to the accompanying drawings forming a part of this specification and in which like numerals designate like parts in all the views,—

Fig. 1 is a perspective view of one form of the invention;

Figs. 2 and 3 are detail views partly in section showing the means for supporting the glass frame on the structural members;

Fig. 4 is a perspective view of a modified form of a frame for holding plural glasses;

Fig. 5 is a vertical sectional view taken through the transverse supporting bars;

Fig. 6 is a view similar to Fig. 5 but taken through the rafters or main supporting bars;

Figs. 7 and 8 are vertical sectional views similar to Figs. 5 and 6 respectively but illustrating the support of a multiple glass frame such as shown in Fig. 4;

Fig. 9 is a perspective view showing the method of assembling a further modification of glass frame construction;

Fig. 10 is a top plan view to better illustrate the assemblage indicated in Fig. 9;

Fig. 11 is a perspective view of a modified form of construction involving a different means of securement of a glass frame to the supporting members;

Fig. 12 is a detail view illustrating a means of locking the elements shown in Fig. 11;

Fig. 13 is a vertical sectional view taken as on the line 13—13 of Fig. 12 and looking in the direction of the arrow;

Fig. 14 is a vertical sectional view taken as on the line 14—14 of Fig. 13 and looking in the direction of the arrow;

Figs. 15 and 16 are views similar to Figs. 5 and 6 but showing a modified form of glass frame wherein gutters are employed to take care of condensation; and Figs. 17 to 25 inclusive are detail sectional views showing various modifications of the support of a glass frame upon the supporting members.

This invention is applicable to skylights, manhole covers, sidewalk vault lights, windows and other similar structures wherein a plurality of glass light-conducting and/or light-refracting prisms or lenses are assembled into a metallic supporting structure consisting primarily of metallic structural members so positioned as to form cells into which the lenses or prisms are cemented. Heretofore such supporting devices have been one-piece castings, or an assemblage of a plurality of such castings, or have been fabricated by employing metallic members of special cross sectional shapes, wherefore considerable expense and unnecessary weight have been involved in the manufacture of such constructions. Therefore, one of the chief objects of this invention is to provide a construction wherein the device may be fabricated by the joining of a plurality of simple light-weight structural members, that is to say by the utilization of members whose transverse cross sections are of simple shapes whereby the cost of such members is reduced to a minimum while retaining the necessary strength, and in its simplest form the invention contemplates the use of flat bar material which may be readily submitted to presses for the formation of necessary cuts and die-stamping formations. Another principal object which readily flows from the foregoing is that said cuts and/or die stampings may be readily varied as to dimensions and locations on the bars in accordance with the particular needs and requirements of the entire device being manufactured.

In the drawings 1 represents a rafter or main supporting bar and 2 is a transverse or lesser bar disposed at right angles thereto, the main bar being provided in the upper edge portion with a slot 3 as shown in Fig. 9 and into which the transverse bar fits so that the upper surfaces of both bars are in the same plane. The slots 3 are spaced in accordance with one dimension of the glass supporting frame, generally indicated by the numeral 4 in Fig. 1, and it will be understood that the spacing of the main bars 1 from each other will be in accordance with the other dimension of said frame, whereby in the finished device there will be formed a plurality of cells each adapted to fittingly receive a glass supporting frame.

In Fig. 1 a plurality of tabs such as 5 are formed by passing bar 1 through a die-stamping press which deflects a punched portion of the bar out of the plane of said bar. Preferably this is done by providing a die which cuts the metal of the bar on what may be said to be three sides of a rectangular area, further operation of the die pushing the metal so cut out of the plane of the bar to form the tab, said tab being hingedly connected to the bar along the fourth side of the rectangular area. Two such tabs are pressed out of the bar to one side thereof to lie in each cell, and another pair as indicated by the numeral 6 is pressed out of the bar to the other side thereof to lie in the next adjacent cell, said tabs 5 and 6 so positioned that their upper surfaces will be disposed from the top edge of the bar a distance equal to the combined thickness of the glass and its supporting frame, see Fig. 5.

In Fig. 1 the glass frame is indicated by the numeral 4 and comprises a rectangular frame either molded or die pressed from sheet material and consists essentially of a base or outwardly extending flange 10 and a substantially vertical upstanding rib 11 upon the latter of which rests the bottom of the glass or lens generally indicated by the numeral 12 see Fig. 5, the flanges 10 adapted to lie upon the upper surfaces of the tabs 5 and 6. To aid in the support of this frame, each of the two sides adjacent the transverse bars 2 is provided at its central portion with a pocket or recess 13 formed in the flange of the frame, and each transverse bar 2 is provided with a slot such as 14 adapted to register with a pocket, whereby as best seen in Fig. 3 a pin or short plate 15 may be inserted through said slot with the ends thereof extending beyond the sides of the transverse bar and into the pockets 13 of two adjacent frames. In order that a frame may be locked in the cell provided therefor, a similar slot 16 is formed in the main bars 1 at substantially the mid point of each cell and through which a key lock 17 may be passed so that its ends will extend on opposite sides of the bar 1 and lie in the angle 18 formed by the flange 10 and rib 11 of a glass frame. The size of each cell is made in accordance with the particular glass lens used and is such that a slight space will be provided between the edges of the glass and the walls of the cell into which a sealing compound 19 may be poured as shown in Figs. 5 and 7, in which latter figure the edge surface of a lens may be provided with corrugations, or other form of roughening, in order to key the sealing compound thereto.

Instead of each cell having a frame supporting a single glass, as shown in Fig. 1, there may be provided a casting or fabrication such as shown at 20 in Figs. 4, 7 and 8 and substantially of the same construction as shown in Fig. 1, except that provision is made for four lenses by the median ribs 21 and 22, the same pocket 13 being provided for support of the sides of the frame on the transverse bars 2. In this construction the ribs will be of such a vertical height that when the frame and glasses are disposed in a cell, the upper surfaces of said ribs will be in the same plane with the upper surfaces of the main and transverse bars 1 and 2 as well as in a plane of the upper surface of the glass, all as distinctly shown in Fig. 8.

In the construction shown in Fig. 11 the cells are formed by main bars 25 notched to receive transverse bars 26 therein in the same manner as the bars 1 and 2 where associated, but in this modified form of the invention the glass frame generally indicated by the numeral 27, unlike the frame 4, is not intended to be completely housed within the cell. On the other hand the frame 27 is formed rectangularly with a continuous outwardly extending flange 28 formed on the two sides of the frame adapted to lie adjacent the transverse bars 26, and with one or more outwardly extending flanges on the other two sides of the frame adapted to lie adjacent the main supporting beams 25.

In the particular frame illustrated in Fig. 11 one of these last mentioned sides of the frame is provided with two such flanges 29 and 30 each extending from a corner of the frame a distance equal approximately to one fouth the dimension of that side of the frame, whereas the opposite side of the frame is provided with but a single flange 31 disposed centrally of the frame side and of a length approximately one half the dimension of that side of the frame. Thus it will be seen that when two such frames are placed side by side, the flange 31 of one frame will lie between the flanges such as 29 and 30 of the adjacent frame.

All of the flanges 28, 29, 30 and 31 are in the same horizontal plane so as to lie upon the upper surfaces of the supporting members 25 and 26, the side walls of the frame extending downwardly below the flanges to fit within the cell formed by the members 25 and 26 see Fig. 14. The flanges 28 on opposite sides of the frame are of a width equal approximately to one half the thickness of the transverse bars 26 so that, as seen in Fig. 14, two adjacent frames will have their flanges 28 resting upon the same transverse bar, but the width of the flanges 29, 30 and 31 is approximately equal to the full width of the main bar 25.

The reason for forming the flanges 29, 30 and 31 as above described is to provide for an interlocking of two adjacent frames by the use of a key 32 of the shape shown in Fig. 12. This key is generally of T shape except that the depending portion is dovetail in shape as shown so that it will be anchored in a similar dovetail slot 33 formed in the upper edge portion of the main bars 25, there being provided a key 32 at each joint between the flange 31 of one frame and the pair of flanges such as 29 and 30 of the next adjacent frame. The sealing compound 19 is applied in the space between the sides of a glass 12 and the sides of the frame 27, as well as in the space 34 between the upstanding walls of two adjacent frames as shown in Figs. 13 and 14.

According to the modification shown in Figs. 9 and 10 transverse bars such as 2 may be provided, passing through slots or notches 3 in the upper edge portion of main bars 40 which latter differ from the main bars or rafters heretofore described in that between each two transverse bars the main bar is provided with a pair of elongated slots 41 and 42 disposed equidistant from said transverse bars and located the same distance below the upper edge of the main bar. Each glass supporting frame is of rectangular shape and adapted to fit closely in the cells provided by the main and transverse bars, two opposite sides of a frame each being provided with a pair of outwardly extending lugs or tongues adapted to fit within the pair of slots of a main bar.

That is to say a frame 43 has on one of its sides a pair of lugs 44 and 45 positioned to fit within the innermost ends of the slots 41 and 42, and the frame 46 adapted to occupy the cell on the opposite side of the main bar 40 is provided with a similar pair of lugs 47 and 48 which however are positioned to lie adjacent the lugs 44 and 45 but in the outermost ends of the slots 41 and 42. By this construction and with reference to Fig. 10 it will therefore be seen that the slot 41 will accommodate the two lugs 44 and 47, and the slot 42 will accommodate the lugs 45 and 48, respectively of the frames 43 and 46 which frames however are on opposite sides of the main supporting bar 40. If desired the two other sides of a frame lying adjacent the transverse bars may be supported as above described and shown in Figs. 1 and 3. This modified construction is not only simple but quite valuable due to its adaptation to glasses of different thicknesses since all that is neecssary is to position the slots 41 and 42 in accordance with the thickness of the lens to be used, and said slots can be readily formed by passing the main bars through a punch press.

With reference to the construction shown in Figs. 15 and 16 and the description hereinabove set forth, it will be understood that the lens frames are carried by main bars 50 adapted to be set obliquely or inclined wherefore this construction is more applicable to skylights, green houses and similar structures where moisture may condense on the under surface of the glasses or lenses; unless the condensation is led away, to a suitable drain, it might otherwise drip down into the space beneath. The transverse bars 51 are passed through notches or slots in the upper edge portions of the main bars to provide the cell structure into which the lenses 12 are fitted. The frame for supporting each lens is somewhat of the shape shown in Fig. 5 except that there is integrally formed therewith, on all four sides, a gutter for collecting the condensation, the gutters such as 52 on the side of the frames adjacent the transverse bars 51 being closer spaced to the under surface of the lens 12 than the gutters such as 53 formed on the two other opposite sides of the frame. The purpose of this is so that the condensation may run from the gutters 52 into the gutters 53 which latter, being alongside the main bars 50, will be downwardly pitched or inclined to the same degree as the inclination of said main bars wherefore the condensation will flow under the urge of gravity to a suitable drain. The gutters 53 of one frame are slightly extended at their ends to pass under the transverse bars 51 and have interfitting engagement with the gutters of the next adjacent frame as indicated at 54 to provide a continuous downwardly inclined gutter 53 from the uppermost lens cell to the lowermost cell.

The modification shown in Fig. 17 includes features shown in Figs. 9 and 16 in that the frames are provided with lugs adapted to fit within slots formed in the structural member or bar, and each frame has a gutter 55 for condensation.

According to Fig. 18 the frame illustrated in Fig. 1 is provided with lugs as shown in Fig. 9 fitting slots in the vertical structural bar as heretofore described.

The construction shown in Figs. 19 and 20 is intended for double glazing, and the frames such as 4 are provided with lugs fitting the vertical bar 40 as hereinbefore stated. In Fig. 19 the upper lens 12 is separated from the lower glass 56 by a strip 57 placed around the four sides of the glasses thereby leaving an air space between the glasses which is suitable for insulating purposes, the lower glass resting upon the supporting frame and the upper glass being flush with the upper edge surface of the bar 40. In Fig. 20 the upper glass 12 rests upon the supporting frame 4 but the lower glass 58 is supported directly by the bar 40. That is to say near the lower edge of said bar there are provided a plurality of slots for receiving lugs extending from the sides of a frame 59 adapted to contact the upper surface of the lower glass 58, there being provided a bracket member 60, secured through its middle to the bar 40 as by the bolt 61, the free edges of the bracket contacting the lower surface of said glass. If desired a thin strip of cushioning material 62 may be inserted between the surface of this glass and the frame 59 and/or bracket 60. In this construction there is not the insulating value of the space between the two glasses (as there is in the case of the construction shown in Fig. 19 where sealing compound 19 is used) because no sealing compound can be advantageously applied to the lower glass 58. Therefore the construction of Fig. 20 is used primarily for ornamental purposes to hide the cellular structure created by the bars 40.

According to the construction shown in Fig. 21 a special bar 65 is employed the sides of the upper edge portion of which are roughened or corrugated as indicated at 66 to serve as a key for the sealing compound 19, and just below the roughened or corrugated surface, the bar is provided on both sides with oppositely disposed recesses for receiving therein lugs as indicated at 67 for supporting the glass frame 4.

The constructions shown in Figs. 22 and 23 are similar and therefore will be considered jointly. In Fig. 22 each glass frame is a modification of that shown in Fig. 2 in that it includes a vertical wall portion 68 adapted to lie in continuation of a surface of the bar 69, and is provided with a plurality of depending brackets such as 70 for additional strength, which brackets are set in vertical slots in the top of the bar. An adjacent frame is similarly formed but the lugs and brackets are staggered with respect to those of the next frame, said lugs adapted to lie on the top edge of said bar, and said lugs being of an extent equal to the thickness of said bar. Sealing compound 19 is applied in the manner shown in Fig. 14. The construction according to Fig. 23 is substantially the same except that the brackets 70 are omitted and in their place the frames are provided with a depending flange 71 adapted to lie alongside the upper edge portion of the bar 69, and the lugs are replaced with ribs which may be continuous or not and adapted to lie over the upper edge of the bar. According to this construction it is also intended that the rib of one frame such as 72 may be positioned so as to lie in continuous contact with the upper edge of the bar whereas the rib on the next adjacent frame 73 is positioned so that it will lie on top of or overlap the rib of the frame 72.

The construction shown in Fig. 24 comprises a bar 75 over the top edge of which is positioned a T shaped saddle member 76 having extending upwardly from its mid point a vertical rib 77 whose sides are corrugated or roughened for keying the sealing compound 19, the extreme upper edge of said rib being flared outwardly if desired. The glass 12 may rest directly upon the outwardly extending portions of the saddle 76 or have a filler or cushioning strip 78 interposed therebetween as shown.

In Fig. 25 there is shown a bar 80 to which the frames such as 81 are bolted as at 82. Each frame comprises a vertical plate portion 83 adapted to lie in surface contact with a side of the bar, extending above the top of said bar in order that sealing compound 19 may be placed between two adjacent frames as well as in the space between the frame plate 83 and the edge of the glass 12. Extending laterally from the frame plate is an upwardly bent rib 11 similar to that shown in Fig.

2 for contactingly receiving thereon the glass 12.

The method of fabrication and assembly is as follows: According to the modification shown in Fig. 1 the main and transverse bars are interfittingly assembled to provide the cells, then the lens frames are set into the cells and then the entire assemblage is then welded and hot dip galvanized. A lens is then set on each glass supporting frame and the sealing compound applied around the frame edges to cement the lenses in place and otherwise form a waterproof closure.

Practically the same procedure is followed with the use of the multiple lens frame shown in Fig. 4.

With respect to the modification shown in Fig. 11, the fabrication is only slightly different. In this construction the main bars 25 and the transverse bars 26 are assembled and welded into a cellular skeleton which is then hot dip galvanized. An outer row of cells is then fitted with their lens frames and the dovetailed keys 32 applied in a sidewise direction. Then the frames of the next row of cells are applied by tilting each frame slightly and forcing its single flange such as 31 into the space between the upper surface of the main bar 25 and the overhanging ends of two keys, then dropping the rest of the frame into its cell, and applying keys 32 as before. Each successive row of frames is similarly inserted in the cellular skeleton and then the lenses and sealing compound applied as previously described.

The modification of construction shown in Figs. 9 and 10 is built up step by step. That is, the main bars 40 are tentatively placed in spaced relation with the transverse bars associated therewith. An outer row of cells is then fitted with their lens frames, the tabs such as 47 and 48 occupying their respective slots in the outermost main bar, and then the next main bar is slid up to these frames to receive the tabs such as 44 and 45 on the opposite side of the frame. Then the second row of lens frames is inserted in the cellular skeleton with the tabs thereof disposed in the slots containing the tabs such as 44 and 45, and then the next main bar is slid up to receive the tabs on the opposite sides of the frames of the second row; and so on, repeating the operations just described until the last main bar is in place, after which the entire assemblage is welded and hot dip galvanized. The lenses are then fitted on their frames and cemented as hereinbefore stated.

The constructions shown in Figs. 15 and 16 may be fabricated after the manner of that described with reference to Fig. 1 except that the transverse bars 51 are adjusted lastly, since the ends of the deep gutters 53 must underlie them.

As to the constructions shown in Figs. 17 to 25 inclusive the manner of fabrication should be evident from what has been previously stated, but it might be added that in these constructions it is contemplated using intersecting bars of the same depth in forming the cells although obviously shallower transverses could be used as shown in the preceding figures.

From the foregoing description it will therefore be seen that according to this invention any depth and size of standard structural bars having simple cross section may be employed wherefore said bars may be passed readily through presses to form on said bars the slots and supporting tabs, which latter especially may be formed at any desired depth or distance from an edge of the bar in accordance with the combined thickness of the glass and its supporting frame; and further it will be obvious that instead of the tabs 5 and 6 being formed integral with the bar, that is hingedly secured thereto by pressing a portion of the bar out of the plane thereof, pieces of metal in the nature of blocks or strips may be welded to the sides of the bar for the same purpose.

While in the foregoing description as well as in the drawings reference is made to the provision of cells for receiving square glasses, this invention contemplates also the support of glasses of other shapes such as rectangular, oblong, round, pentagonal, hexagonal, and other regular polygonal shapes. With the use of circular glasses there will be provided a frame whose sides form a regular polygon so that the crossfitted structural bars may be continuous in their extent. Also with frames which are pentagonal and hexagonal, it is intended that the supporting tabs will be provided on two non-adjacent sides of a cell wherefore said tabs will be substantially on opposite sides of the cells with respect to the pentagonal shape. Lastly attention is directed to the complementally arranged extensions 29, 30 and 31 shown in Fig. 11. In other words while this illustration is only one form of the invention it is to be understood that a greater number of flanges or extensions may be employed on a frame side but, regardless of the number, these extensions will be so positioned as to provide spaces therebetween into which will fit the extensions of the next adjacent frame when the two frames are assembled in the cell skeleton.

It is obvious that those skilled in the art may vary the details of construction and arrangements of parts without departing from the spirit of this invention and therefore it is not desired to be limited to the foregoing disclosure except as may be demanded by the claims.

What is claimed is:—

1. In a device of the character described the combination of structural members interfitted to provide a plurality of cells; a frame supported in each cell; a glass supported by said frame, the edges of said glass spaced from said members to provide a narrow channel therebetween; and means in said channel to secure said glass and frame to said members.

2. In a device of the character described the combination of structural members interfitted to provide a plurality of cells; a frame in each cell; tabs formed on opposite walls of each cell for supporting a frame; a glass supported by said frame; and means to secure said glass and frame to said members.

3. In a device of the character described the combination of structural members interfitted to provide a plurality of cells; a frame in each cell; spaced frame supports on opposite walls of each cell; a glass supported by said frame; and means to secure said glass and frame to said members.

4. In a device of the character described the combination of structural members interfitted to provide a plurality of cells; a frame in each cell; frame supports integrally formed on at least two substantially opposite walls of each cell, the remaining walls provided with removable frame supports; a glass supported by said frame; and means to secure said glass and frame to said members.

5. In a device of the character described the combination of structural members interfitted to provide a plurality of cells, said members provided in each cell with frame supports, some of said supports being removable; a frame in each cell resting upon said supports; a glass supported by said frame; and means to secure said glass and frame to said members.

6. In a device of the character described the combination of structural members interfitted to provide a plurality of cells, said members provided in each cell with frame supports, some of said supports being removable while the others are firmly secured to said members on at least two non-adjacent sides of a cell; a frame in each cell resting upon said supports; a glass supported by said frame; and means to secure said glass and frame to said members.

7. In a device of the character described the combination of structural members interfitted to provide a plurality of cells; a frame supported in each cell, said frame provided with an upwardly extending edge on each side thereof; a glass supported by said edges of said frame and substantially filling a cell to transmit the maximum amount of light through the device, the glass having edges spaced from said members to provide a narrow channel therebetween; and means in said channel to secure said glass and frame to said members.

8. In a device of the character described the combination of structural members interfitted to provide a plurality of cells, opposite walls of a cell having openings therein; a frame in each cell provided with extensions registrable with said openings, said extensions for supporting said frame; a glass supported by said frame; and means to secure said glass and frame to said members, said means including keys engageable with said openings and said extensions.

9. In a device of the character described the combination of structural members interfitted to provide a plurality of cells, opposite walls of a cell having openings therein; a frame in each cell provided with extensions registrable with said openings, said extensions for supporting said frame; a glass supported by said frame; and means to secure said glass and frame to said members, said means including keys lockingly engageable with said openings and overlying said extensions.

10. In a device of the character described the combination of structural members interfitted to provide a plurality of cells, opposite walls of a cell having openings therein; a frame in each cell provided with extensions having portions registrable with said openings, said extensions for supporting said frame; a glass supported by said frame; and means to secure said glass and frame to said members, said means including keys engageable with said openings and said portions of said extensions.

11. In a device of the character described the combination of structural members interfitted to provide a plurality of cells, opposite walls of a cell having dovetailed openings therein; a frame in each cell provided with extensions overlying the top edges of said members, the ends of said extensions registrable with the sides of said openings, said extensions for supporting said frame; a glass supported by said frame; and means to secure said glass and frame to said members, said means including keys having bases lockingly engageable with said openings and having oppositely directed side portions overlying the extensions of two adjacent frames.

12. In a device of the character described the combination of main structural members and lesser structural members crossfitted therewith to provide a plurality of cells arranged in rows, the main structural members between two adjacent rows having dovetailed openings in the upper edge portion thereof; a frame in each cell provided on opposite sides with complementally arranged extensions overlying the top edges of said main structural members for supporting said frame, the ends of said extensions registrable with the sides of said openings; a glass supported by said frame; and means to secure said glass and frame to said members, said means including keys having bases lockingly engageable with said openings and having oppositely directed side portions overlying the ends of the complemental extensions of two adjacent similarly formed frames.

13. In a device of the character described the combination of main structural members and lesser structural members crossfitted therewith to provide a plurality of cells arranged in rows, the main structural members between two adjacent rows having dovetailed openings in the upper edge portion thereof; a frame in each cell provided on two opposite sides with complementally arranged extensions of a width to overlie the top edges of said main structural members, and provided on the other of its sides with extensions having substantially one-half the width of the top edges of said lesser structural members, all of said extensions for supporting said frame, the ends of said complemental extensions registrable with the sides of said openings; a glass supported by said frame; and means to secure said glass and frame to said members, said means including keys having bases lockingly engageable with said openings and having oppositely directed side portions overlying the ends of the complemental extensions of two adjacent similarly formed frames.

GEORGE H. LENKE.